US005089977A

United States Patent [19]

[11] Patent Number: 5,089,977

[45] Date of Patent: Feb. 18, 1992

Pflästerer et al.

[54] PROCESS FOR CONTROLLING THE INKING OF PRINTED PRODUCTS AND APPARATUS FOR PERFORMING THE PROCESS

[75] Inventors: Jürgen Pflästerer, Dossenheim; Norbert Freyer, Sandhausen, both of Fed. Rep. of Germany

[73] Assignee: Heidelberger Druckmaschinen AG, Heidelberg, Fed. Rep. of Germany

[21] Appl. No.: 478,445

[22] Filed: Feb. 12, 1990

[30] Foreign Application Priority Data

Feb. 10, 1989 [DE] Fed. Rep. of Germany ....... 3903981

[51] Int. Cl.[5] ............ G01J 3/46

[52] U.S. Cl. ............ 364/526; 395/131; 364/DIG. 2

[58] Field of Search ............ 364/526, 571.02, 571.04; 356/425, 243; 101/177, 365

[56] References Cited

U.S. PATENT DOCUMENTS

| | | | |
|---|---|---|---|
| 4,494,875 | 1/1985 | Schramm et al. | 356/425 |
| 4,649,502 | 3/1987 | Keller et al. | 364/519 |
| 4,706,206 | 11/1987 | Benoit et al. | 364/526 |
| 4,752,892 | 6/1988 | Lecha | 356/425 |
| 4,901,254 | 2/1990 | Dolezalek et al. | 364/526 |
| 4,967,379 | 10/1990 | Ott | 364/526 |
| 4,975,862 | 12/1990 | Keller et al. | 364/526 |

FOREIGN PATENT DOCUMENTS

| | | |
|---|---|---|
| 0142470 | 5/1985 | European Pat. Off. . |
| 0143744 | 6/1985 | European Pat. Off. . |
| 0337148 | 10/1989 | European Pat. Off. . |
| 2202188 | 12/1987 | United Kingdom . |

*Primary Examiner*—Thomas G. Black
*Assistant Examiner*—Ellis B. Ramirez
*Attorney, Agent, or Firm*—Herbert L. Lerner; Laurence A. Greenberg

[57] ABSTRACT

A process for controlling the inking of printed products, wherein an original provided with ink control fields, is subjected to a colorimetric measurement includes colorimetrically measuring diffuse-reflectance of at least one three-color screen field of the original and computing and storing a setpoint color locus therefrom spectrally measuring color-related diffuse-reflectance values and diffuse-reflectance values of a three-color screen field by measuring control fields on a printed sheet which has been produced in a set-up phase, calculating an actual color locus from the spectral diffuse reflectance of the three-color screen field, taking into account a distance between the setpoint color locus and the actual color locus, and taking into account preset inking values and machine-specific characteristic curves, calculating a theoretical actual color locus from the measured color-related diffuse-reflection values, repeatedly calculating the theoretical actual color locus, if necessary, with the respective ink deviation until the deviation is at a minimum, and basing the production run on the thus obtained inking values.

3 Claims, 3 Drawing Sheets

H = K(DIO)
C
H
DIO

31 MEASURING POINTS
(20 MEASURING HEADS)
38
31
1
37
MULTIPLEXER
36
MEASURING LINE
MEASURING CONTROL
33
A
O
34
BUFFER STORAGE
35
32
CPU
31
PROGRAM MEMORY
39
DATA MEMORY
40
DATA BACK-UP MEMORY
41
SYSTEM BUS
KEYBOARD ENCODER
43
INTER-FACE
46
DISPLAY DRIVER/MEMORY
45
KEYBOARD
42
DIGITAL DISPLAY
44
30
CPC 2
CPC 1
47
48

PROCESS FOR CONTROLLING THE INKING OF PRINTED PRODUCTS AND APPARATUS FOR PERFORMING THE PROCESS

The invention relates to a process and apparatus for controlling the inking of printed products.

Processes with densitometric measurement of an original as well as processes wherein spectral or tristimulus colorimetry are provided have become known heretofore. A commercially available spectral-based colorimeter suitable for the aforementioned purpose is produced by the Process Monitoring and Control Division of Hunter-Lab of Reston, Va. The processes with densitometric measurement require a precise knowledge of the proofing and production materials (paper and ink) as well as a trial run coordinated with this special combination of materials.

Colorimetry affords a direct comparison of setpoint and actual values of the colorimetric quantities. This is based on multicolor screen fields, the combined color value of which is divided into the three available color inks, namely cyan, magenta and yellow, for controlling the printing machine. A central constituent of the conventional processes of this general type is a linear system of equations for the conversion of the combined color value into the individual color-related quantities. The coefficients required for the solution of this system of equations apply, respectively, to one particular combination of materials for the production run and must be determined on the basis of a trial run.

It is, accordingly, an object of the invention to provide an apparatus and process for controlling the inking of printed products, wherein values are obtained from the measurement of originals, produced by any means, those values being intended for use directly as target quantities in the printing process.

Another object of the invention is to provide such an apparatus and process wherein, during the printing process, other inks and originals may be used than for the proofing, without any requirement for several trial runs in order to obtain a sufficiently precise adjustment of the inking.

With the foregoing and other objects in view, there is provided, in accordance with the invention, a process for controlling the inking of printed products, wherein an original provided with ink control fields, is subjected to a colorimetric measurement, which comprises colorimetrically measuring diffuse-reflectance of at least one three-color screen field of the original, and computing and storing a setpoint color locus therefrom, spectrally measuring color-related diffuse-reflectance values and diffuse-reflectance values of a three-color screen field by measuring control fields on a printed sheet which has been produced in a set-up phase, calculating an actual color locus from the spectral diffuse reflectance of the three-color screen field, taking into account a distance between the setpoint color locus and the actual color locus, and taking into account preset inking values and machine-specific characteristic curves, calculating a theoretical actual color locus from the measured color-related diffuse-reflectance values, repeatedly calculating the theoretical actual color locus, if necessary, with the respective ink deviation until the deviation is at a minimum, and basing the production run on the thus obtained inking values.

In accordance with another feature of the invention, the process includes taking into account color values assigned to the respectively used printing inks when calculating the theoretical actual value, the color values having been obtained from a previous spectral measurement of the diffuse reflectance of a layer which is of such thickness that the diffuse reflectance of the printed sheet is negligible.

In accordance with a concomitant aspect of the invention, there is provided an apparatus for controlling the inking of printed products wherein an original provided with ink control fields, is subjected to a colorimetric measurement, comprising means for colorimetrically measuring diffuse-reflectance of at least one three-color screen field of the original, and means for computing and means for storing a setpoint color locus therefrom, means for spectrally measuring color-related diffuse-reflectance values and diffuse-reflectance values of a three-color screen field through a measurement of control fields on a printed sheet which has been produced in a set-up phase, means for calculating an actual color locus from the spectral diffuse reflectance of the three-color screen field with means for taking into account a distance between the setpoint color locus and the actual color locus, as well as preset inking values and machine-specific characteristic curves, means for calculating a theoretical actual color locus from the measured color-related diffuse-reflectance values, means for repeatedly calculating the theoretical actual color locus with the respective ink deviation until the deviation is at a minimum, and means for performing a production run based upon the thus-obtained inking values.

Other features which are considered as characteristic for the invention are set forth in the appended claims.

Although the invention is illustrated and described herein as embodied in a process for controlling the inking of printed products, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figures 1, 1A:
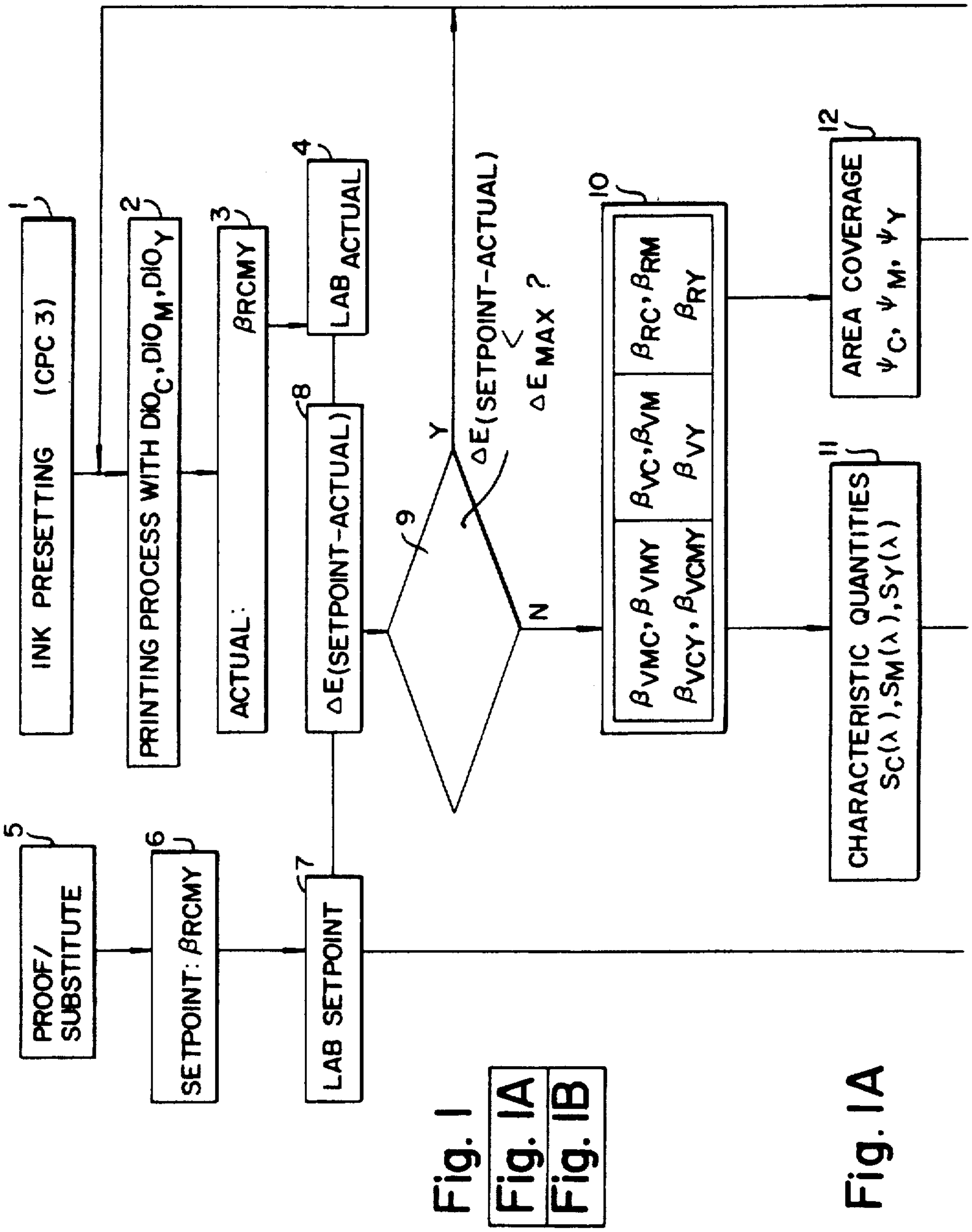
FIGS. 1A and 1B are flow charts of the process of controlling the inking of printed products according to the invention.
Figure 1B:
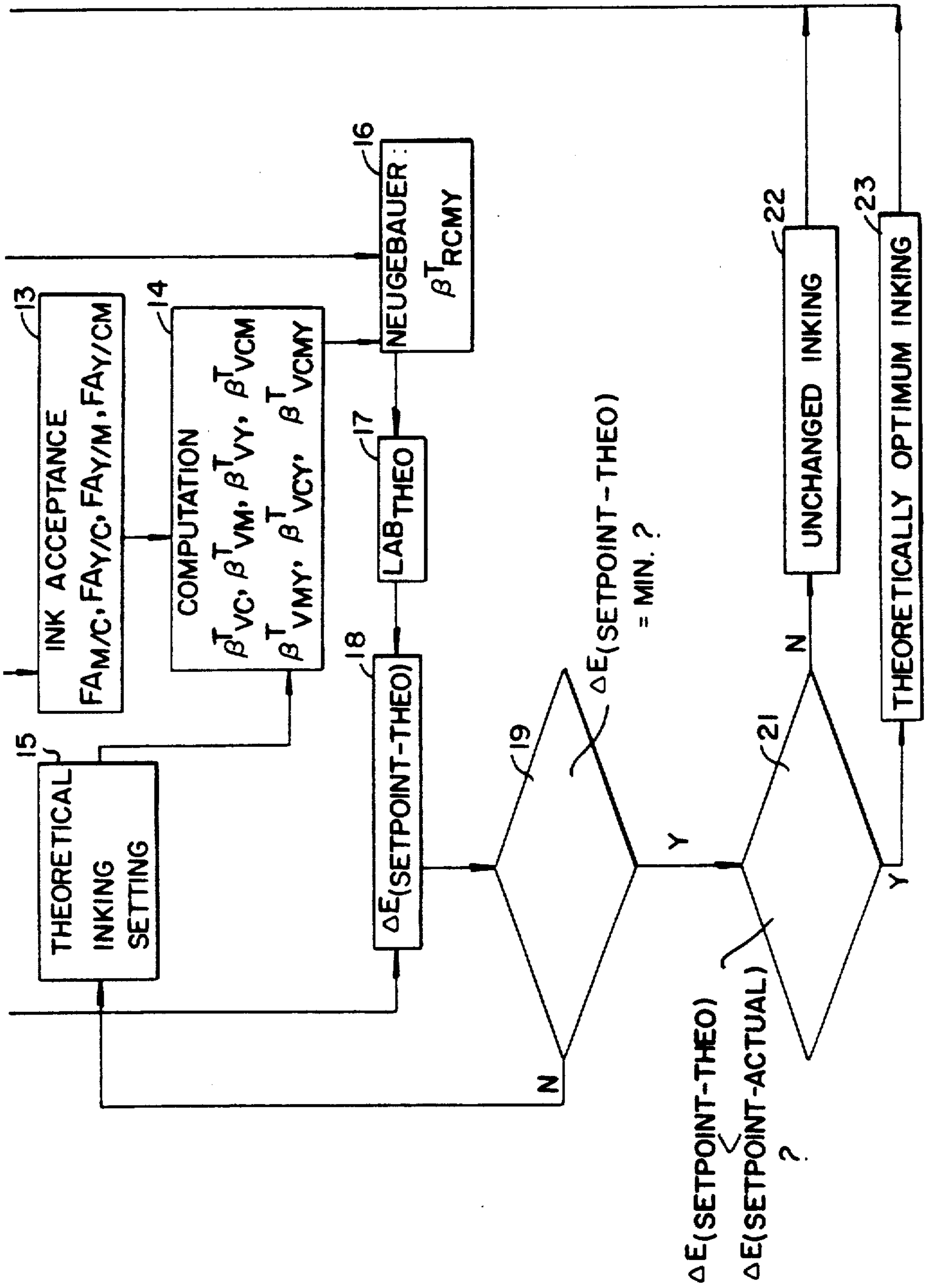

Referring now to the drawing and, first, particularly to FIG. 1 thereof, there is initially shown in the flow chart, a step of ink presetting 1, for example, with the aid of a plate reader of the type know as the CPC 3 of Heidelberger Druckmaschinen Aktiengesellschaft. As a set-up phase, a printing process 2 is performed with the aid of preset inking values $DIO_C$, $DIO_M$ and $DIO_Y$, respectively, for the colors cyan, magenta and yellow. In a following measuring run 3, a diffuse reflectance $\beta_{RCMYactual}$ of a three-color screen field is measured spectrally on the thus produced sheet. The values for the diffuse reflectance $\beta_{RCMYactual}$ obtained by this spectral measurement of the three-color screen field are converted at 4, in accordance with the CIELAB system. (CIE = Commission Internationale de l'Eclairage), into color coordinates $LAB_{actual}$. Other color spaces, for example LUV, may also be used.

An original 5 produced in accordance with a proofing process, likewise, contains a three-color screen field, a diffuse reflectance $\beta_{RCMYsetpoint}$ of which is measured at 6 and is converted at 7, into color coordinates $LAB_{setpoint}$. The ink spacing or deviation $DeltaE_{(setpoint-actual)}$ is calculated at 8 from the coordinates $LAB_{actual}$ 4 and $LAB_{setpoint}$ 7. The result is then examined at 9 as to whether it is already less than a maximum allowable value $DeltaE_{max}$. Should this be the case, the printing process is initiated at 2.

If the ink spacing or deviation $DeltaE_{(setpoint\ actual)}$ is greater than the maximum allowable value, however, a recomputation of the inking and a computation of theoretical diffuse-reflectance values $\beta_{theo}$ are performed with the aid of the steps described hereinafter. For this purpose, further diffuse reflectances are spectrally measured, initially, at 10 on the printed sheet which is produced. More specifically, these are $\beta_{VCM}$ of a three-color fulltone overprint field, $\beta_{VMC}$, $\beta_{VCY}$ and $\beta_{VMY}$ of a respective two-color full-tone overprint field, $\beta_{VC}$, $\beta_{VM}$ and $\beta_{VY}$ of a respective single-color full-tone field and $\beta_{RC}$, $\beta_{RM}$ and $\beta_{RY}$ of three single-color screen fields, respectively.

Characteristic quantities $S_C$, $S_M$, $S_Y$ are calculated from the measured diffuse-reflectance values at 11 and, at 12, area coverages $phi_C$, $phi_M$ and $phi_Y$ of the three colors, respectively, as a function of the wavelength lambda. Ink acceptance FA for an overprint of two colors and for an overprint of the color Y on the colors C and M is calculated in a step 13 from the characteristic quantities $S_C$, $S_M$, $S_Y$.

In the following steps, a first run is based upon the preset values for $DIO_C$, $DIO_M$ and $DI_Y$. In further runs, insofar as are necessary, theoretical values of $DIO_C$, $DIO_M$ and $DIO_Y$, obtained from the respectively preceding runs, are taken into account until a minimum value of the ink spacing or deviation $DeltaE_{(setpoint-theo)}$ has been found. In a step 14, the theoretical values of the diffuse reflectance $\beta_{Vtheo}$ are calculated from the characteristic quantities and from the values for the ink acceptance, taking into account the preset and theoretical values, respectively, of the inking. Therefrom, a theoretical spectral diffuse reflectance $\beta_{RCMYtheo}$ is calculated at 16 in accordance with the formulas of Neugebauer. From the latter, the theoretical color coordinates $LAB_{theo}$ are determined at 17 and are compared at 18 with the color coordinates $LAB_{setpoint}$ with the formation of the ink spacing or deviation $DeltaE_{(setpoint-theo)}$. If this ink spacing or deviation $DeltaE_{(setpoint-theo)}$ is smaller than the value $DeltaE_{(n-1)}$ calculated in the previous run (branch 19), a renewed computation of the theoretical inking is performed at the process step 15 with a view to minimizing the ink spacing or deviation. In this regard, a slight modification of the values $DIO_C$, $DIO_M$ and $DIO_Y$ towards the setpoint color locus $LAB_{setpoint}$ is performed. The relationship between layer thickness on the sheet and the inking values $DIO_{Ctheo}$, $DIO_{Mtheo}$ and $DIO_{Ytheo}$ may be stored in a computer as a characteristic curve either in the form of a table or in parametrized form, there being, for example, an individual characteristic curve for each type of machine. Process steps 14, 16, 17 and 18 employ these values for computing a further ink spacing or deviation DeltaE. This is repeated until a rise in the DeltaE value indicates that a minimum value of DeltaE has been found.

According to a further development of the invention, after the branch 19, it is possible to perform a comparison, at 21, with the ink spacing or deviation $DeltaE_{(setpoint-actual)}$, which was calculated at 8 based upon the color coordinates $LAB_{actual}$ after the printing process 2. A checkup is thereby made whether the recomputation of the inking has actually resulted in an improvement with regard to the original setting of the inking. If this is not the case, printing is initiated with unchanged inking via 22. If an improvement has occurred, however, the theoretically optimum inking values of the printing press are introduced at 23, so that printing is performed on the basis of these values.

Figures 2, 3:
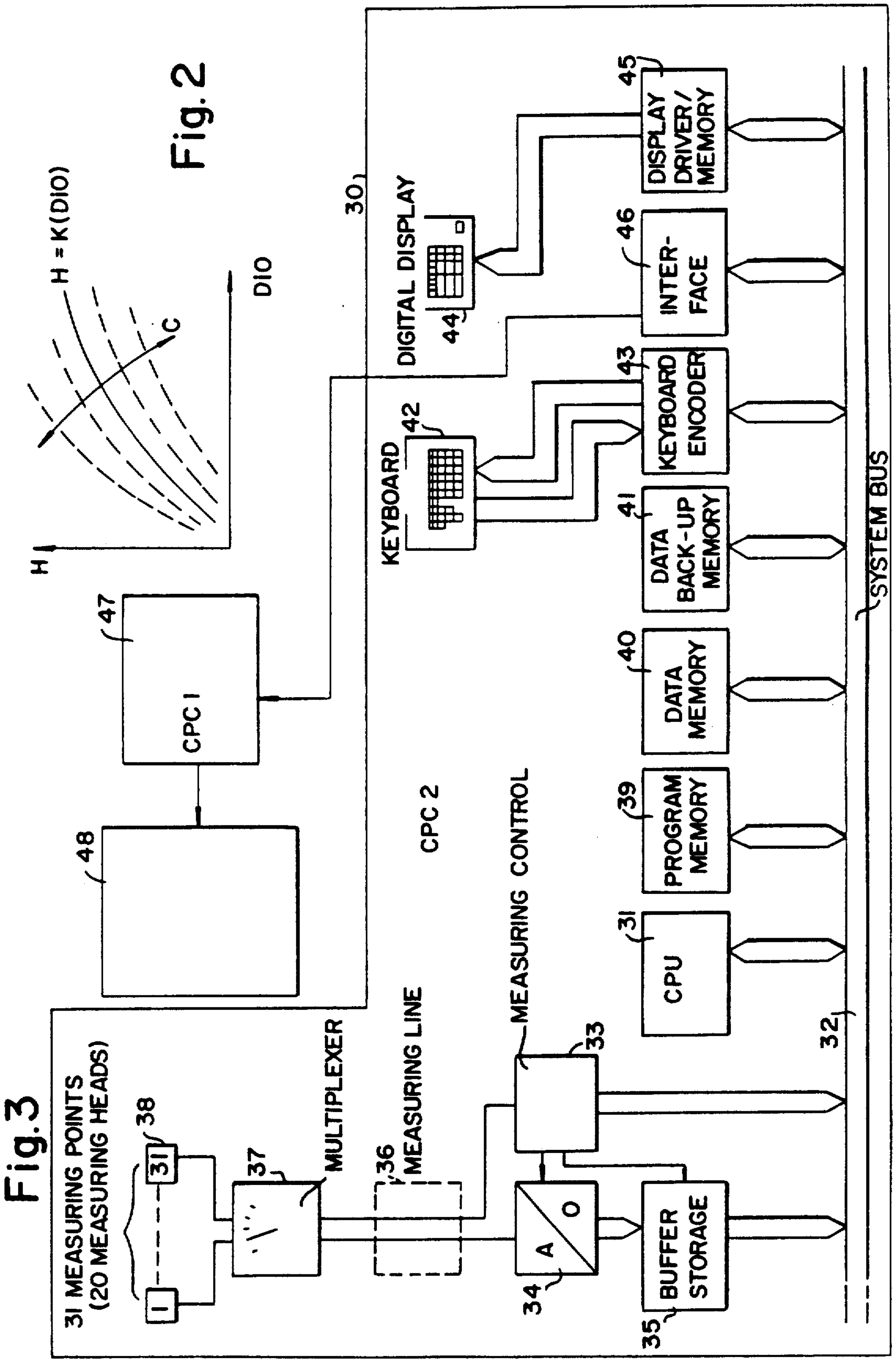
FIG. 2 is a plot diagram depicting the relationship between ink-layer thickness and adjusted value of the inking elements.
FIG. 3 is a block diagram of an apparatus for performing the process of controlling the inking of printed products according to the invention.

FIG. 2 shows the relationship between layer thickness h and respective inking value DIO, where K(DIO) usually represents a non-linear dependence of the layer thickness h on the regulated variable DIO, while the portion c, which is dependent on the subject (area coverage), on the substrate (paper) and on other things, is assumed to be linear.

$$h = C \cdot K(DIO)$$
$$K_C(DIO_C)$$
$$K_M(DIO_M)$$
$$K_Y(DIO_Y)$$

The formulas required for implementing the process steps 11 to 14 and 16 follow hereinafter. For technical reasons, the theoretical values are characterized by a superscript T which is equivalent to the subscript theo used in the specification.

For each color:

$$f(\lambda) = \frac{[1 - \beta_\infty(\lambda)]^2}{2\beta_\infty(\lambda)};$$

$$a(\lambda) = 1 + f(\lambda);$$

$$b(\lambda) = \sqrt{a^2(\lambda) - 1}$$

In order to compute the diffuse reflectances $\beta_{Vtheo}$, color values a and b are required, each of which is obtained according to the foregoing equations from the diffuse reflectance of a layer of such thickness that the diffuse reflectance of the printed material or product is negligible. The determination of the diffuse reflectances $\beta_\infty C$, $\beta_\infty M$, $\beta_\infty Y$ may be effected by measuring a suitable thickly applied ink and is not represented in FIG. 1.

In the process step 11 of FIG. 1, characteristic quantities $S_M$, $S_C$ and $S_Y$ are derived, each as a function of the wavelength and according to the following equations, from the color values and from the diffuse-reflectance values determined at 10; this is based on the aforementioned relationship between the layer thickness c and the inking DIO. In the following equations, the quantity $\beta_{PW}$ is the diffuse reflectance of the printed product or material.

For each color:

$$h = C \cdot K(Dio)\ S(\lambda) = C \cdot s(\lambda)$$

$$A(\lambda) = \frac{1 - a(\lambda)(\beta_V + \beta_{PW}) + \beta_V\beta_{PW}}{b(\lambda)(\beta_V - \beta_{PW})}$$

-continued $$S(\lambda) = \frac{1}{2b(\lambda)K(Dio)} \cdot \ln\frac{A(\lambda)+1}{A(\lambda)-1}$$

What is essential to the process according to the invention is the combining of the purely ink-specific quantity s(lambda) (distribution of the ink) with the subject-dependent and setting-dependent constant c because it is necessary thereby to determine only the product *S(lambda)=c·s(lambda)* and not the individual quantities. This characteristic quantity S(lambda) is therefore ink and zone-specific.

The characteristic values $S_{M/C}$ and so forth are analogous to the characteristic values $S_C$, $S_M$ and so forth. While paper white is used, for the values $S_C$ and so forth, as the substrate for the layer of the color 1 which is to be printed, $S_{M/C}$ indicates, for example, the corresponding characteristic value for the case wherein the color M is printed on a previously printed layer of the color C. The difference in ink acceptance when printing on paper and when printing on another ink, respectively, the machine being otherwise identically set, is thereby taken into consideration.

These characteristic values enter into the computations of the full-tone overprint fields in the form of the quantity of the ink acceptance FA. The computation of the ink acceptance FA in accordance with the process step 13 of FIG. 1, follows hereinafter the ink acceptances being defined for each color combination from full-tone fields and full-tone overprint fields through $h_{M/Y}=FA_{M/Y}\,h_M$, and so forth.

$$\beta^T_{VC} = \frac{1-\beta_{PW}\{a_C(\lambda) - b_C(\lambda)\coth[b_C(\lambda)\cdot S_C(\lambda)\cdot K_C(Dio_C)]\}}{a_C(\lambda) + b_C(\lambda)\coth[b_1(\lambda)\cdot S_C(\lambda)\cdot K_C(Dio_C)] - \beta_{PW}}$$

$$\beta^T_{VM} = \frac{1-\beta_{PW}\{a_M(\lambda) - b_M(\lambda)\coth[b_M(\lambda)\cdot S_M(\lambda)\cdot K_M(Dio_M)]\}}{a_M(\lambda) + b_M(\lambda)\coth[b_M(\lambda)\cdot S_M(\lambda)\cdot K_M(Dio_M)] - \beta_{PW}}$$

$$\beta^T_{VY} = \frac{1-\beta_{PW}\{a_Y(\lambda) - b_Y(\lambda)\coth[b_Y(\lambda)\cdot S_Y(\lambda)\cdot K_Y(Dio_Y)]\}}{a_Y(\lambda) + b_Y(\lambda)\coth[b_Y(\lambda)\cdot S_Y(\lambda)\cdot K_Y(Dio_Y)] - \beta_{PW}}$$

$$\beta^T_{VCM} = \frac{1-\beta^T_{VC}\{a_M(\lambda) - b_M(\lambda)\coth[b_M(\lambda)\cdot FA_{M/C}\cdot S_M(\lambda)\cdot K_M(Dio_M)]\}}{a_M(\lambda) + b_M(\lambda)\coth[b_M(\lambda)\cdot FA_{M/C}\cdot S_M\cdot K_M(Dio_M)] - \beta^T_{VC}}$$

$$\beta^T_{VCY} = \frac{1-\beta^T_{VC}\{a_Y(\lambda) - b_Y(\lambda)\coth[b_Y(\lambda)\cdot FA_{Y/C}\cdot S_Y(\lambda)\cdot K_Y(Dio_Y)]\}}{a_Y(\lambda) + b_Y(\lambda)\coth[b_Y(\lambda)\cdot FA_{Y/C}\cdot S_Y(\lambda)\cdot K_Y(Dio_Y)] - \beta^T_{VC}}$$

$$\beta^T_{VMY} = \frac{1-\beta^T_{VM}\{a_Y(\lambda) - b_Y(\lambda)\coth[b_Y(\lambda)\cdot FA_{Y/M}\cdot S_Y(\lambda)\cdot K_Y(Dio_Y)]\}}{a_Y(\lambda) + b_Y(\lambda)\coth[b_Y(\lambda)\cdot FA_{Y/M}\cdot S_Y(\lambda)\cdot K_Y(Dio_Y)] - \beta^T_{VM}}$$

$$\beta^T_{VCMY} = \frac{1-\beta^T_{VCM}\{a_Y(\lambda) - b_Y(\lambda)\coth[b_Y(\lambda)\cdot FA_{Y/CM}\cdot S(\lambda)\cdot K_Y(Dio_Y)]\}}{a_Y(\lambda) + b_Y(\lambda)\coth[b_Y(\lambda)\cdot FA_{Y/CM}\cdot S_Y(\lambda)\cdot K_Y(Dio_Y)] - \beta^T_{VCM}}$$

The area coverages phi to be computed with the aid of the aid of the process step 12 of FIG. 1 result from the following equations with the optical area coverages for each color being computed from full-tone and screen-tone fields and then being held constant for subsequent adjustment.

$$\phi_C(\lambda) = \frac{\beta_{RC} - \beta_{PW}}{\beta_{VC} - \beta_{PW}}$$

$$\phi_M(\lambda) = \frac{\beta_{RM} - \beta_{PW}}{\beta_{VM} - \beta_{PW}}$$

$$\phi_Y(\lambda) = \frac{\beta_{RY} - \beta_{PW}}{\beta_{VY} - \beta_{PW}}$$

Following are the equations required in accordance with the process step 14 for computing the theoretical diffuse-reflectance values of the single-, two- and three-color full-tone fields.

$$\beta^T_{VC} = \frac{1-\beta_{PW}\{a_C(\lambda) - b_C(\lambda)\coth[b_C(\lambda)\cdot S_C(\lambda)\cdot K_C(Dio_C)]\}}{a_C(\lambda) + b_C(\lambda)\coth[b_1(\lambda)\cdot S_C(\lambda)\cdot K_C(Dio_C)] - \beta_{PW}}$$

$$\beta^T_{VM} = \frac{1-\beta_{PW}\{a_M(\lambda) - b_M(\lambda)\coth[b_M(\lambda)\cdot S_M(\lambda)\cdot K_M(Dio_M)]\}}{a_M(\lambda) + b_M(\lambda)\coth[b_M(\lambda)\cdot S_M(\lambda)\cdot K_M(Dio_M)] - \beta_{PW}}$$

$$\beta^T_{VY} = \frac{1-\beta_{PW}\{a_Y(\lambda) - b_Y(\lambda)\coth[b_Y(\lambda)\cdot S_Y(\lambda)\cdot K_Y(Dio_Y)]\}}{a_Y(\lambda) + b_Y(\lambda)\coth[b_Y(\lambda)\cdot S_Y(\lambda)\cdot K_Y(Dio_Y)] - \beta_{PW}}$$

$$\beta^T_{VCM} = \frac{1-\beta^T_{VC}\{a_M(\lambda) - b_M(\lambda)\coth[b_M(\lambda)\cdot FA_{M/C}\cdot S_M(\lambda)\cdot K_M(Dio_M)]\}}{a_M(\lambda) + b_M(\lambda)\coth[b_M(\lambda)\cdot FA_{M/C}\cdot S_M\cdot K_M(Dio_M)] - \beta^T_{VC}}$$

$$\beta^T_{VCY} = \frac{1-\beta^T_{VC}\{a_Y(\lambda) - b_Y(\lambda)\coth[b_Y(\lambda)\cdot FA_{Y/C}\cdot S_Y(\lambda)\cdot K_Y(Dio_Y)]\}}{a_Y(\lambda) + b_Y(\lambda)\coth[b_Y(\lambda)\cdot FA_{Y/C}\cdot S_Y(\lambda)\cdot K_Y(Dio_Y)] - \beta^T_{VC}}$$

$$\beta^T_{VMY} = \frac{1-\beta^T_{VM}\{a_Y(\lambda) - b_Y(\lambda)\coth[b_Y(\lambda)\cdot FA_{Y/M}\cdot S_Y(\lambda)\cdot K_Y(Dio_Y)]\}}{a_Y(\lambda) + b_Y(\lambda)\coth[b_Y(\lambda)\cdot FA_{Y/M}\cdot S_Y(\lambda)\cdot K_Y(Dio_Y)] - \beta^T_{VM}}$$

-continued $$\beta^{T}_{VCMY} = \frac{1 - \beta^{T}_{VCM}\{a_Y(\lambda) - b_Y(\lambda)\coth[b_Y(\lambda) \cdot FA_{Y/CM} \cdot S(\lambda) \cdot K_Y(Dio_Y)]\}}{a_Y(\lambda) + b_Y(\lambda)\coth[b_Y(\lambda) \cdot FA_{Y/CM} \cdot S_Y(\lambda) \cdot K_Y(Dio_Y)] - \beta^{T}_{VCM}}$$

The computation of the diffuse-reflectance spectrum of the theoretical three-color screen field via modified Neugebauer equations according to the process step 16 is effected as follows:

$$\begin{aligned}\beta^{T}_{RCMY} = {} & (1-\phi_C)(1-\phi_M)(1-\phi_Y) \\ & \beta_{PW} + \phi_C(1-\phi_M)(1-\phi_Y)\beta^{T}_{VC} \\ & + \phi_M(1-\phi_C)(1-\phi_Y)\beta^{T}_{VM} \\ & + \phi_Y(1-\phi_C)(1-\phi_M)\beta^{T}_{VY} \\ & + \phi_C\phi_M(1-\phi_Y)\beta^{T}_{VCM} + \phi_M\phi_Y(1-\phi_C)\beta^{T}_{VMY} \\ & + \phi_C\phi_Y(1-\phi_M)\beta^{T}_{VCY} + \phi_C\phi_M\phi_Y\beta^{T}_{VCMY}\end{aligned}$$

FIG. 4 is a block diagram of essential components of a measuring apparatus of the model CPC2 of Heidelberger Druckmaschinen AG, by means of which it is possible, with corresponding readily apparent modifications and with a program corresponding to the flow chart of FIG. 1 for performing the sequence of operations, to implement the process according to the invention. To control the entire apparatus, a central processing unit (CPU) 31 is provided, which exchanges data with the other units via a system bus 32. To control the actual measuring procedure, a measuring control 33 is provided, which is connected to an analog/digital converter 34, a buffer storage 35 and, via a measuring line 36, a multiplexer 37. The thus controlled multiplexer 37 dials, one after the other, the thirty-one measuring points and twenty measuring heads, respectively, which, in contrast with the original CPC2, are adapted for colorimetric measurement rather than densitometric measurements.

Programs for the central processing unit 31 are stored in the program memory 39. Furthermore, a data memory 40 and a data back-up memory 41 are provided. The latter is buffered by a battery, not illustrated in detail, and stores the data even after the apparatus has been switched off. Commands and data may be inputted via a keyboard 42, which is connected to the system bus 32 via a keyboard encoder 43. Information may be made accessible to the user via a digital display 44, which is connected to the system bus 32 through a display driver/memory 45. The system bus 32 also has an interface 46 connected thereto, with the aid of which, the setting values $DIO_C$, $DIO_M$ and $DIO_Y$, computed by the process according to the invention, are transmitted to a remote-control console (CPC1) 47 and, thus, to control elements of a printing press 48, otherwise not illustrated in detail.

We claim:

1. Process for controlling the inking of printed products, wherein an original provided with ink control fields, is subjected to a colorimetric measurement, which comprises colorimetrically measuring diffuse-reflectance of at least one three-color screen field of the original and computing and storing a setpoint color locus therefrom, spectrally measuring color-related diffuse-reflectance values and diffuse-reflectance values of a three-color screen field by measuring control fields on a printed sheet which has been produced in a set-up phase, calculating an actual color locus from the spectral diffuse reflectance of the three-color screen field, taking into account a distance between the setpoint color locus and the actual color locus, and taking into account preset inking values and machine-specific characteristic curves, calculating a theoretical actual color locus from the measured color-related diffuse-reflectance values, repeatedly calculating the theoretical actual color locus with the respective ink deviation until the deviation is at a minimum, and performing a production run of printed products which includes controlling the inking of the printed products based upon the thus obtained inking values.

2. Process according to claim 1, which includes taking into account color values assigned to the respectively used printing inks when calculating the theoretical actual value, the color values having been obtained from a previous spectral measurement of the diffuse reflectance of a layer which is of such thickness that the diffuse reflectance of the printed sheet is negligible.

3. Apparatus for controlling the inking of printed products wherein an original provided with ink control fields, is subjected to a colorimetric measurement, comprising means for colorimetrically measuring diffuse-reflectance of at least one three-color screen field of the original, and means for computing and means for storing a setpoint color locus therefrom, means for spectrally measuring color-related diffuse-reflectance values and diffuse-reflectance values of a three-color screen field through a measurement of control fields on a printed sheet which has been produced in a set-up phase, means for calculating an actual color locus from said spectral diffuse reflectance of said three-color screen field with means for taking into account a distance between said setpoint color locus and said actual color locus, as well as preset inking values and machine-specific characteristic curves, means for calculating a theoretical actual color locus from said measured color related diffuse-reflectance values, means for repeatedly calculating said theoretical actual color locus with said respective ink deviation until said deviation is at a minimum, and means for performing a production run of printed products including means for controlling the inking of the printed products based upon the thus-obtained inking values.

* * * * *